US012684049B2

(12) United States Patent

Arora

(10) Patent No.: US 12,684,049 B2

(45) Date of Patent: Jul. 14, 2026

(54) METHOD AND SYSTEM FOR RECONCILIATION OF PUBLISHER AND SUBSCRIBER EVENTS USING BLOCKCHAIN

(71) Applicant: Mastercard International Incorporated, Purchase, NY (US)

(72) Inventor: Manuj Arora, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 58 days.

(21) Appl. No.: 18/950,678

(22) Filed: Nov. 18, 2024

(65) Prior Publication Data

US 2026/0143041 A1 May 21, 2026

(51) Int. Cl.
H04L 67/55 (2022.01)
H04L 12/18 (2006.01)

(52) U.S. Cl.
CPC .......... H04L 67/55 (2022.05); *H04L 12/1859* (2013.01)

(58) Field of Classification Search
CPC ..... G06F 9/542; H04L 12/18; H04L 12/1809; H04L 12/1859; H04L 12/1863; H04L 67/55
See application file for complete search history.

(56) References Cited

U.S. PATENT DOCUMENTS 12,256,030 B1 * 3/2025 Thompson .............. H04L 67/12
2017/0310628 A1 * 10/2017 Norwood ............ H04L 12/1859
2024/0152414 A1 * 5/2024 Vo ........................... G06F 9/542

OTHER PUBLICATIONS

Amazon, What is Kafka? Apache Kafka Explained—AWS, aws. amazon.com/what-is/apache-kafka/# :~: text=Apache% 20Kafka% 20is%20a%20distributed, the%20data%20records%20in% 20simultaneously, Nov. 18, 2024, 8 pages.

* cited by examiner

*Primary Examiner* — Vivek Srivastava
*Assistant Examiner* — William C Mcbeth
(74) *Attorney, Agent, or Firm* — Panitch Schwarze Belisario & Nadel LLP

(57) ABSTRACT

A method for reconciliation of published events using blockchain includes: publishing, a plurality of events on an event platform during a period of time; transmitting a numerical count of the plurality of events published on the event platform during the period of time to a blockchain node of a blockchain network for adding to a blockchain; receiving a first block on the blockchain that includes a number of events consumed on the event platform during the period of time, the number of events consumed being less than the numerical count of the plurality of events; generating event data for each of one or more of the plurality of events published on the event platform during the period of time; and transmitting the generated event data to the blockchain node for adding to the blockchain.

16 Claims, 5 Drawing Sheets

300

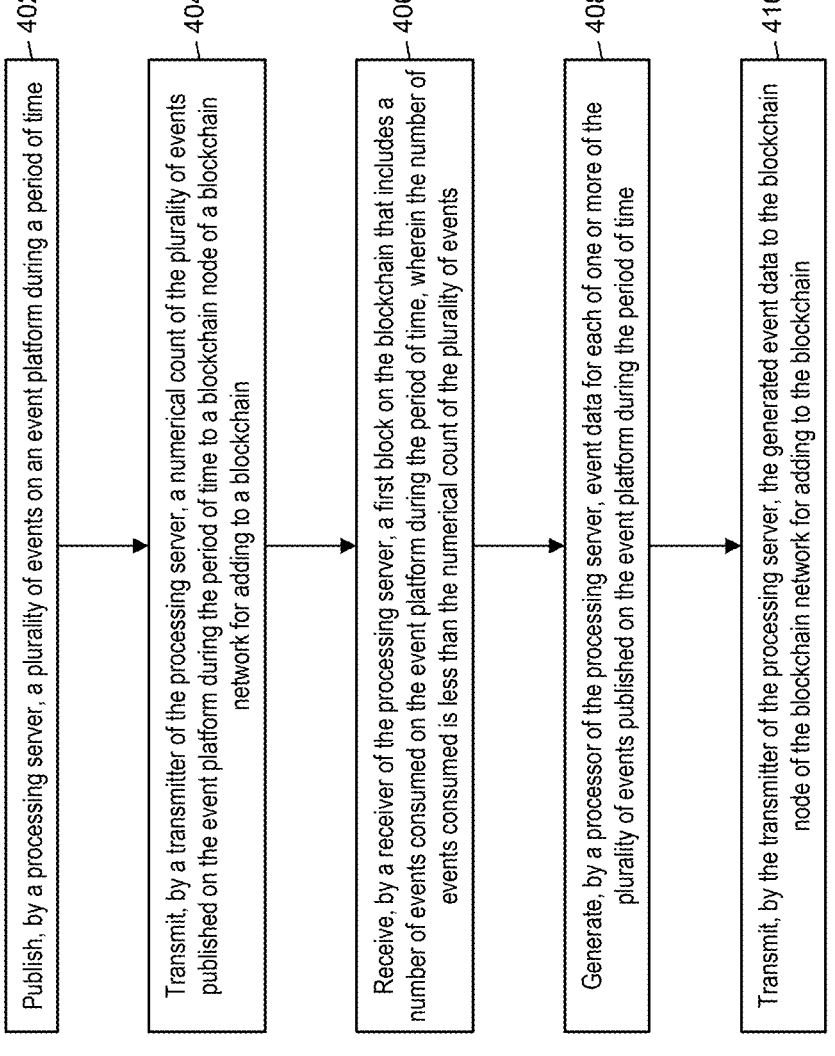

Publish, by a processing server, a plurality of events on an event platform during a period of time — 402

Transmit, by a transmitter of the processing server, a numerical count of the plurality of events published on the event platform during the period of time to a blockchain node of a blockchain network for adding to a blockchain — 404

Receive, by a receiver of the processing server, a first block on the blockchain that includes a number of events consumed on the event platform during the period of time, wherein the number of events consumed is less than the numerical count of the plurality of events — 406

Generate, by a processor of the processing server, event data for each of one or more of the plurality of events published on the event platform during the period of time — 408

Transmit, by the transmitter of the processing server, the generated event data to the blockchain node of the blockchain network for adding to the blockchain — 410

METHOD AND SYSTEM FOR RECONCILIATION OF PUBLISHER AND SUBSCRIBER EVENTS USING BLOCKCHAIN

FIELD

The present disclosure relates to the reconciliation of publisher and subscriber events using blockchain, specifically the use of blocks in a blockchain to convey data used in the auditing of the consuming of events published during a specific period of time.

BACKGROUND

In event driven architectures, a publish-subscribe model, commonly referred to as "pub-sub," "pub/sub," or "Pub-Sub," is often used. The pub-sub model can be ideal for persisting messages and enables consumers to subscribe to only those messages of interest by utilizing categorization tools provided by many event platforms.

However, due to the number of systems and connections involved, network or infrastructure problems can affect the ability for a subscriber to consume events where any issue occurring at the publisher, event platform, subscriber, or data storage or network service providers for any of the system can result in a subscriber missing a message. In some cases, the missing of a message can result in a subscriber operating with inaccurate information, which can be detrimental.

With existing event architectures, a subscriber is often completely unaware if they miss a message. Even in cases where a subscriber may be able to identify that they have not consumed every event message, there are a lack of tools available for the subscriber or publisher to identify what event or events have been missed. In such instances, a subscriber may have to review every published message to ensure that it was received and consumed, which can be a time consuming and resource-intensive process. Thus, there is a need for a technological solution to provide for fast and efficient auditing and reconciliation of pub-sub events.

SUMMARY

The present disclosure provides a description of systems and methods for reconciliation of published events using blockchain. An event publisher can publish a number of events on an event platform during a specific period of time. The event publisher can submit the number of events to a blockchain node for publishing on a blockchain. A subscriber can read the number of events and compare it to the number of events consumed during that same period of time and submit the number of consumed events back to a blockchain node for publishing on the blockchain. The event publisher can identify the number of consumed events for the subscriber and determine that it is less than the number of events published during that same period of time, indicating that the subscriber missed one or more events. The event publisher can generate a list of identifiers for the events published during that period, which can be added to the blockchain. The subscriber can obtain the list of identifiers from the blockchain and identify the one or more events that were not consumed, by comparing those identifiers with the consumed events. The subscriber can then make a list of identifiers for missed events available to the publisher, such as via the blockchain or event platform. The publisher can then identify event data for the missed events for delivery to the subscriber via the event platform. The result is a fast and efficient process for auditing and reconciliation of pub-sub event messages that utilizes a blockchain for effective and secure conveying of auditing data.

A method for reconciliation of published events using blockchain includes: publishing, by a processing server, a plurality of events on an event platform during a period of time; transmitting, by a transmitter of the processing server, a numerical count of the plurality of events published on the event platform during the period of time to a blockchain node of a blockchain network for adding to a blockchain; receiving, by a receiver of the processing server, a first block on the blockchain that includes a number of events consumed on the event platform during the period of time, wherein the number of events consumed is less than the numerical count of the plurality of events; generating, by a processor of the processing server, event data for each of one or more of the plurality of events published on the event platform during the period of time; and transmitting, by the transmitter of the processing server, the generated event data to the blockchain node of the blockchain network for adding to the blockchain.

A system for reconciliation of published events using blockchain includes: a blockchain network including a plurality of blockchain nodes; an event platform; and a processing server, wherein the processing server publishes a plurality of events on the event platform during a period of time, transmits, via a transmitter, a numerical count of the plurality of events published on the event platform during the period of time to one blockchain node of the plurality of blockchain nodes for adding to a blockchain, receives, via a receiver, a first block on the blockchain that includes a number of events consumed on the event platform during the period of time, wherein the number of events consumed is less than the numerical count of the plurality of events, generates, via a processor, event data for each of one or more of the plurality of events published on the event platform during the period of time, and transmits, via the transmitter, the generated event data to the one blockchain node for adding to the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for reconciliation of published events using blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Reconciliation of Events Using Blockchain

Figure 1:
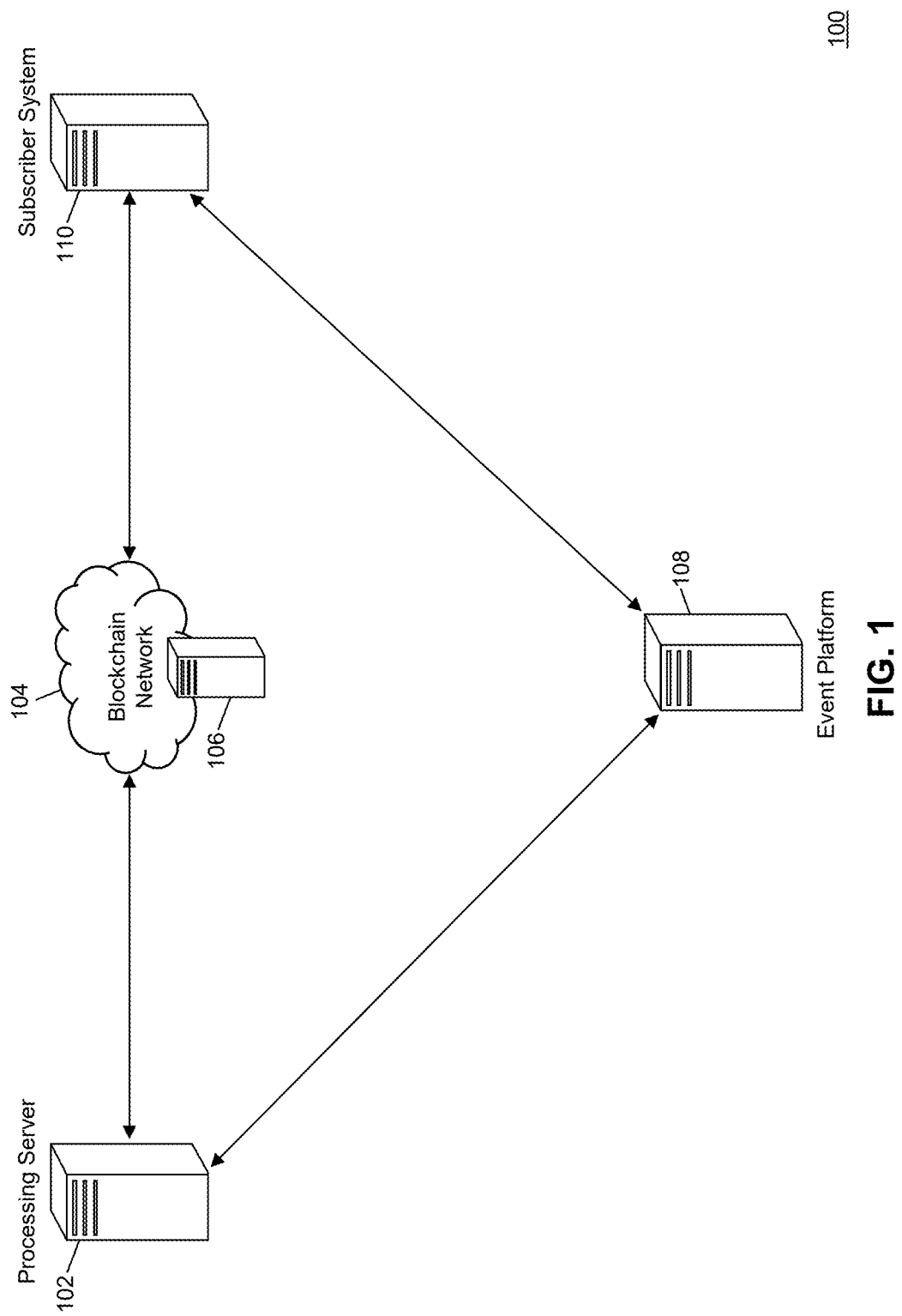
FIG. 1 is a block diagram illustrating a high level system architecture for reconciliation of published events using blockchain in accordance with exemplary embodiments.
Figure 5:
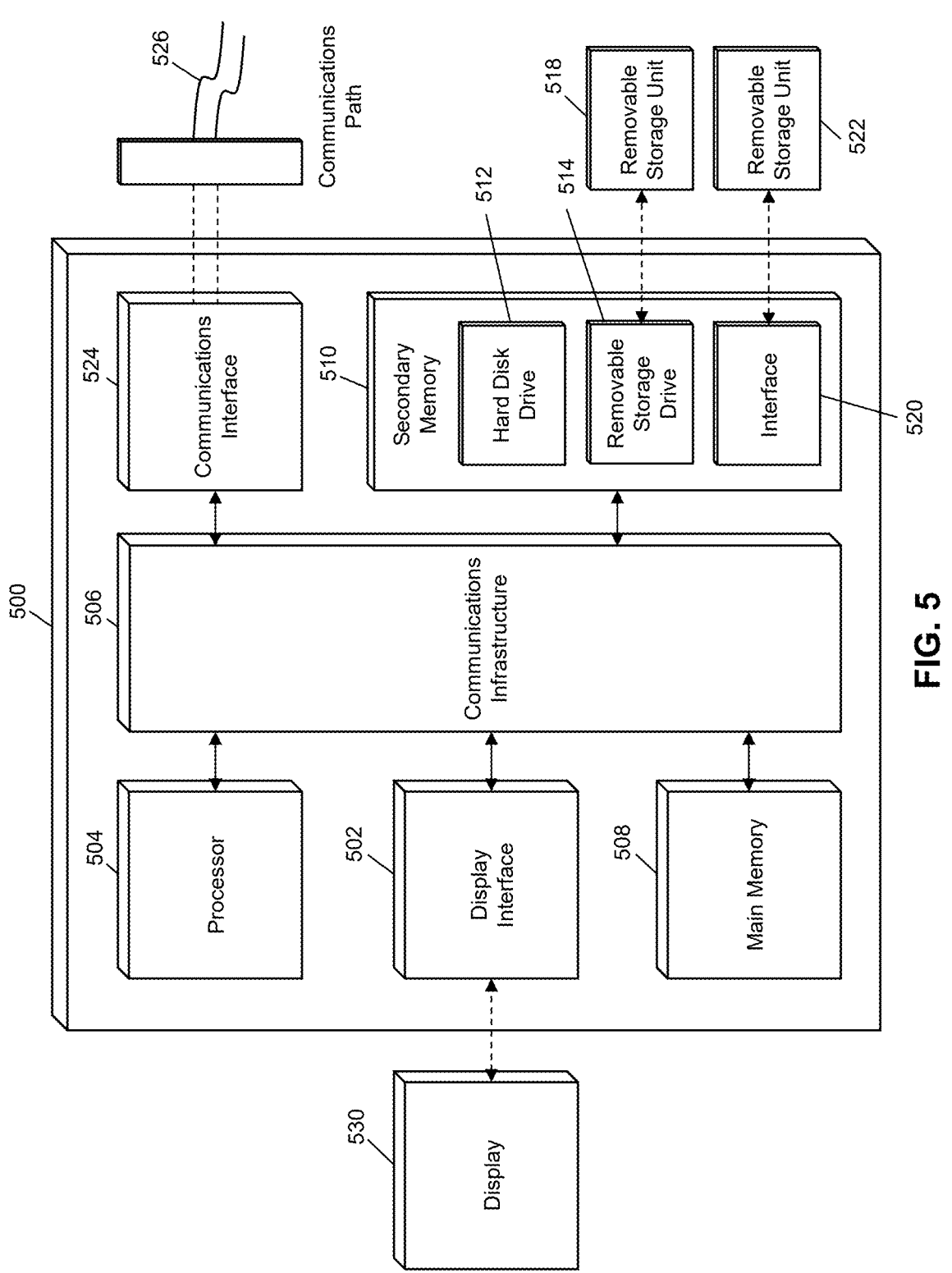
FIG. 5 is a block diagram illustrating a computer system architecture in accordance with exemplary embodiments.

FIG. 1 illustrates a system 100 for the reconciliation of published events in a pub-sub architecture using a blockchain. The system 100 can include a processing server 102. The processing server 102, discussed in more detail below, can be a component in a system of an event publisher. In a traditional pub-sub architecture, the processing server 102 can generate events that are published via an event platform 108. The event platform 108 can be a system that handles real-time data feeds for the publishing and subscription of event messages, such as a system that utilizes Apache Kafka. In order to provide for auditing and reconciliation of missed events by a subscriber, the system 100 can also include a blockchain network 104. The blockchain network 104 can be comprised of a plurality of blockchain nodes 106. Each blockchain node 106 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in a blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the respective blockchain network 104 using the public key of the cryptographic key pair. In some cases, the term "blockchain wallet" can refer specifically to the private key. In other cases, the term "blockchain wallet" can refer to a computing device (e.g., processing server 102) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of that is generated using the sender's private key, a blockchain address of the recipient of currency generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in a blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be used for the storage of data used in the auditing and reconciliation of event messages published by the processing server 102. The processing server 102 can generate a plurality of different event messages that are published via the event platform 108 using suitable communication networks and methods. The processing server 102 can keep track of the number of event messages published during a specific period of time. In some cases, the same period of time can always be used, such as a thirty-minute time period, an hour time period, a day time period, etc. In other cases, the period of time can vary. For instance, a shorter time period can be used for the processes discussed herein during busier, higher traffic times while a longer time period can be used during less busy times. For example, a time period of thirty minutes can be used during working hours while a time period of two hours can be used during other times.

After a time period has passed, the processing server 102 can electronically transmit the number of event messages published during that period of time to a blockchain node 106 in the blockchain network 104 using a suitable communication network and method. The blockchain node 106 can receive the number of published event messages, referred to herein as EventCount, and include the number in a new blockchain data entry that is included in a new block that is generated and added to a blockchain associated with the blockchain network 104 using traditional methods and systems. In some embodiments, the processing server 102 can digitally sign the EventCount using its private key. In such embodiments, the blockchain node 106 may verify the digital signature using the corresponding public key before adding the EventCount to the blockchain. In other cases, systems that utilize the EventCount can validate the digital signature using the public key prior to use of the Event-Count, such as to ensure the EventCount value being used is genuine and comes from the processing server 102.

In some embodiments, the blockchain data entry that includes the EventCount can also include data associated with the time period. For instance, the blockchain data entry can include a smart timestamp and either an end timestamp or a period length value. In one example, a blockchain data entry can include a startTimestamp value, an endTimestamp value, an eventCount value, and any other values suitable for performing the functions discussed herein or may be of interest to the publisher or subscriber systems.

In the system 100, a subscriber system 110 can be interested in auditing their consumed events and utilize the blockchain of the blockchain network 104 for reconciliation. The subscriber system 110 can be a computing system of a subscriber that subscribers to event messages published by the processing server 102 via the event platform 108. The subscriber system 110 can receive and event messages published via the event platform 108 including the plurality of event messages published during the period of time specified in the new blockchain data entry. As part of the consumption of events, the subscriber system 110 can keep track of the number of consumed events, referred to herein as AuditCount, during each period of time.

Once a period of time has elapsed, the subscriber system 110 can identify the EventCount for that time period on the blockchain, such as by utilizing the timestamps. In cases where multiple publishers can utilize the blockchain for storing auditing data, blockchain data entries can include an identifier associated with the publisher to which the timestamp and EventCount data corresponds, where the subscriber system 110 can use such identifier to ensure identification of the correct EventCount value for the time period. Once the subscriber system 110 has identified the Event-Count, they can use the value to audit their consumption of event messages by comparing the value to their own Audit-Count. In order to ensure reconciliation of any missed event messages, the subscriber system 110 can transmit its Audit-Count to a blockchain node 106 in the blockchain network

104 for addition to the blockchain. In some cases, the subscriber system may only provide the AuditCount to a blockchain node 104 if the value for the AuditCount is different from the EventCount, such as to ensure reconciliation is performed. In other cases, the AuditCount may always be added to the blockchain, where the processing server 102 can review AuditCount values for subscriber systems 110 to ensure subscriber systems 110 are properly receiving event messages.

The blockchain node 106 that receives the AuditCount from the subscriber system 110 can generate a new blockchain data entry that includes the AuditCount value and include that new blockchain data entry in a new block that is generated and added to the blockchain using traditional systems and methods. In some cases, the blockchain data entry can include an identifier associated with the subscriber system 110. In some embodiments, the subscriber system 110 can digitally sign the AuditCount using its private key, where the digital signature can be validated by the blockchain node 106 or processing server 102 using the corresponding public key. In some instances, the blockchain data entry can also include the timestamp data included in the blockchain data entry with the EventCount identified by the subscriber system 110, such as to ensure that the processing server 102 identifies the correct time period to which the AuditCount applies.

When a new AuditCount value is added to the blockchain, the processing server 102 can identify the new blockchain data value and obtain the AuditCount therefrom. The processing server 102 can then compare the AuditCount with its EventCount for the time period. If the values match, then no further action regarding that time period may be performed by the processing server 102. The processing server 102 can then continue to publish event messages on the event platform 108 for additional time periods and repeat the auditing process with the subscriber system 110. If the values do not match, then the processing server 102 can identify event data for the plurality of event messages that were published during the time period. The event data can include any data suitable for performing the functions discussed herein, such as an event identifier. An event identifier can be a value that is unique to that event message among all other event messages published by the processing server 102 and/or the event platform 108. In an example, the processing server 102 can generate a list of all event identifiers, also referred to herein as EventIDs, for the plurality of event messages published during the time period.

Once the event data has been identified, the processing server 102 can electronically transmit the event data to the blockchain node 106 using a suitable communication network and method. The blockchain node 106 can include the event data in a new blockchain data entry that is included in a new block that is generated and added to the blockchain using traditional methods and systems. In some cases, the processing server 102 can digitally sign the event data prior to transmission to the blockchain node 106, which can be validated by the blockchain node 106 prior to addition of the event data to the blockchain and/or validated by a subscriber system 110 prior to utilizing the event data, as discussed in more detail below. In some instances, the blockchain data entry that includes the event data can also include the information identifying the time period to which it applies and an identifier for the processing server 102, as applicable.

Once the event data is available on the blockchain, the subscriber system 110 can identify the event data therefrom. The subscriber system 110 can then compare the event data with data regarding the consumed event messages obtained by the subscriber system 110 during the consumption of event messages published via the event platform 108 during the time period. In an example, the event data may include the list of EventIDs for each of the event messages published during the time period. In such an example, the subscriber system 110 can generate its own list of EventIDs for each event message consumed during the time period, which the subscriber system 110 can then compare against the list of EventIDs identified from the blockchain. As a result of the comparison, the subscriber system 110 can identify the event message(s) that were published on the event platform 108 but not consumed by the subscriber system 110 during the time period. The subscriber system 110 can then generate a list of event data for the missed event message(s), which the subscriber system 110 can electronically transmit to the blockchain node 106 using a suitable communication network and method.

The blockchain node 106 can include the list of event data for the missed event message(s) in a new blockchain data entry that is generated and added to a new block that is generated and added to the blockchain using traditional methods and systems. In some cases, the blockchain data entry can also include timestamp data, an identifier, and/or a digital signature generated by the subscriber system 110 using its private key, as applicable. The processing server 102 can identify the list of event data for the missed event message(s) in the newly added blockchain data entry and identify the missed event message(s) using the event data in the list. The processing server 102 can then have the missed event message(s) delivered to the subscriber system 110, such as via a function of the event platform 108, a message broker, or other suitable method. The subscriber system 110 can then receive the missed event message(s) and then have a complete set of event messages for the time period.

The methods and systems discussed herein provide for fast, efficient, and effective reconciliation of published event messages in a pub-sub architecture via use of the blockchain network 104. The use of a blockchain ensures that data is accurate and auditable by all participants, as the data stored therein is immutable and cannot be tampered with or falsified. Such immutability can be beneficial in industries where compliance with regulations is required and can be beneficial for publishers to ensure that subscribers are not operating with missing event messages and for subscribers to ensure that publishers are not tampering with data for published event messages. As a result, publishers and subscribers can constantly maintain accurate publishing and consumption of event messages and quickly reconcile any discrepancies.

In some embodiments, the processing server 102 can include the event data with the EventCount when transmitting the EventCount to the blockchain node 106. In such an embodiment, the event data can be included in the blockchain data entry that includes the EventCount. The subscriber system 110 can then immediately identify the missed event message(s) if the subscriber system's AuditCount is different from the EventCount identified in the blockchain data entry. In such cases, the process can be further streamlined. In other embodiments, the process can be performed without the addition of the EventCount value on the blockchain.

Processing Server

Figure 2:
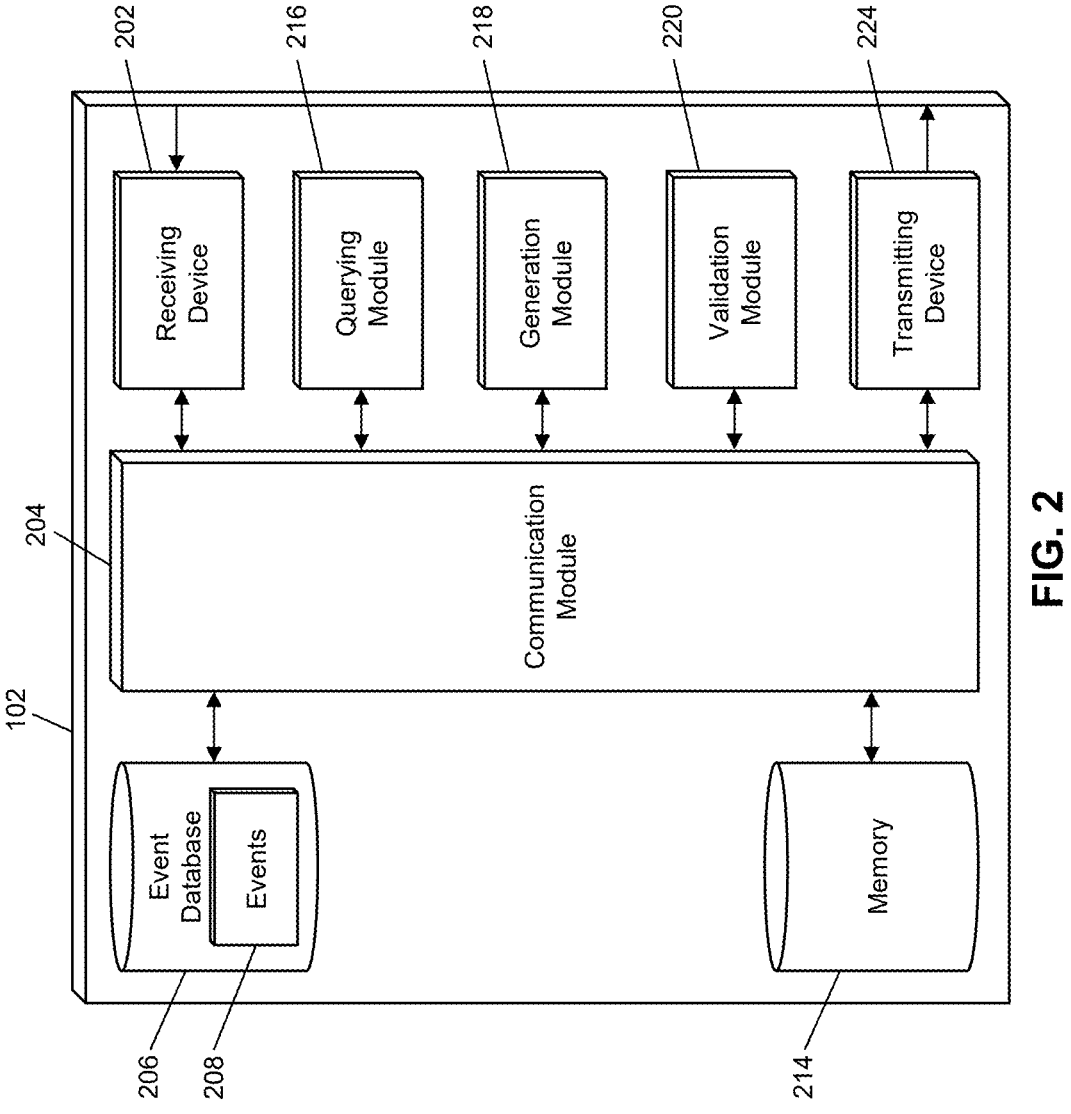
FIG. 2 is a block diagram illustrating the processing server in the system of FIG. 1 for reconciliation of published events using blockchain in accordance with exemplary embodiments.

FIG. 2 illustrates an embodiment of the processing server 102 in the system 100. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102.

The processing server 102 can include a receiving device 202. The receiving device 202 can be configured to receive data over one or more networks via one or more network protocols. In some instances, the receiving device 202 can be configured to receive data from blockchain nodes 106, event platforms 108, subscriber systems 110, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 106, which can be superimposed or otherwise encoded with converted device profiles, public keys, configuration keys, configuration key requests, request for identification data, blockchain data entries, blocks, confirmation messages, etc. The receiving device 202 can also be configured to receive data signals electronically transmitted by event platforms 108 that can be superimposed or otherwise encoded with requests for event messages and other communications used in the publishing of events on the event platform 108. The receiving device 202 can also be configured to receive data signals electronically transmitted by subscriber systems 110 in implementations where a publisher can communicate directly with a subscriber for the conveyance of missed event messages or other data used in the publishing and consumption of event messages on the event platform 108.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include an event database 206. The event database 206 can be configured to store one or more events 208 using a suitable data storage format and schema. The event database 206 can be a relational database that utilizes structured query language for the storage, identification, modifying, updating, accessing, etc. of structured data sets stored therein. Each event 208 can be a structured data set configured to store data related to an event for which an event message is published via the event platform 108. The event 208 can include the event message, an EventID unique to the event 208, and any other suitable data, such as one or more category values, timestamp data, time period data, etc.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys including public keys and/or private keys, communication data, blockchain algorithms and data, encryption algorithms, event category data, timestamp data, etc.

The processing server 102 can include a querying module 216. The querying module 216 can be configured to execute queries on databases to identify information. The querying module 216 can receive one or more data values or query strings and can execute a query string based thereon on an indicated database, such as the blockchain data 206 of the processing server 102 to identify information stored therein. The querying module 216 can then output the identified information to an appropriate engine or module of the processing server 102 as necessary. The querying module 216 can, for example, execute a query on the event database 206 to identify event identifiers for events 208 whose event messages were published on the event platform 108 during a specific time period.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate events 208, event messages, EventCount values, lists of event data, EventIDs, etc.

The processing server 102 can also include a validation module 220. The validation module 220 can be configured to perform data validations and verifications for the processing server 102 as part of the functions discussed herein. The validation module 220 can receive instructions as input, can perform data validations or verification as instructed, and can output a result of the data validations or verifications to one or more modules of the processing server 102. In some cases, the input can include the data to be validated or verified and/or data to be used in the validation or verification. In other cases, the validation module 220 can be configured to identify such data, such as in the event database 206 and/or memory 214. The validation module 220 can be configured to, for example, validate digital signatures, perform comparisons of EventCount and AuditCount values, etc.

The processing server 102 can also include a transmitting device 224. The transmitting device 224 can be configured to transmit data over one or more networks via one or more network protocols. In some instances, the transmitting device 224 can be configured to transmit data to blockchain nodes 106, event platforms 108, subscriber systems 110, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to blockchain nodes 106, which can be superimposed or otherwise encoded with public key requests, configuration keys, configuration key requests, blockchain data entries, blocks, confirmation messages, EventCount values, event data, etc. The transmitting device 224 can also be configured to electronically transmit data signals to event platforms 108 that can be superimposed or otherwise encoded with event messages and other data used in the publishing of event messages on the event platform 108. The transmitting device 224 can also be configured to electronically transmit data signals to subscriber systems 110 in implementations where a publisher can communicate directly with a subscriber for the conveyance of missed event messages or other data used in the publishing and consumption of event messages on the event platform 108.

Process for Reconciliation of Event Messages

Figure 3:
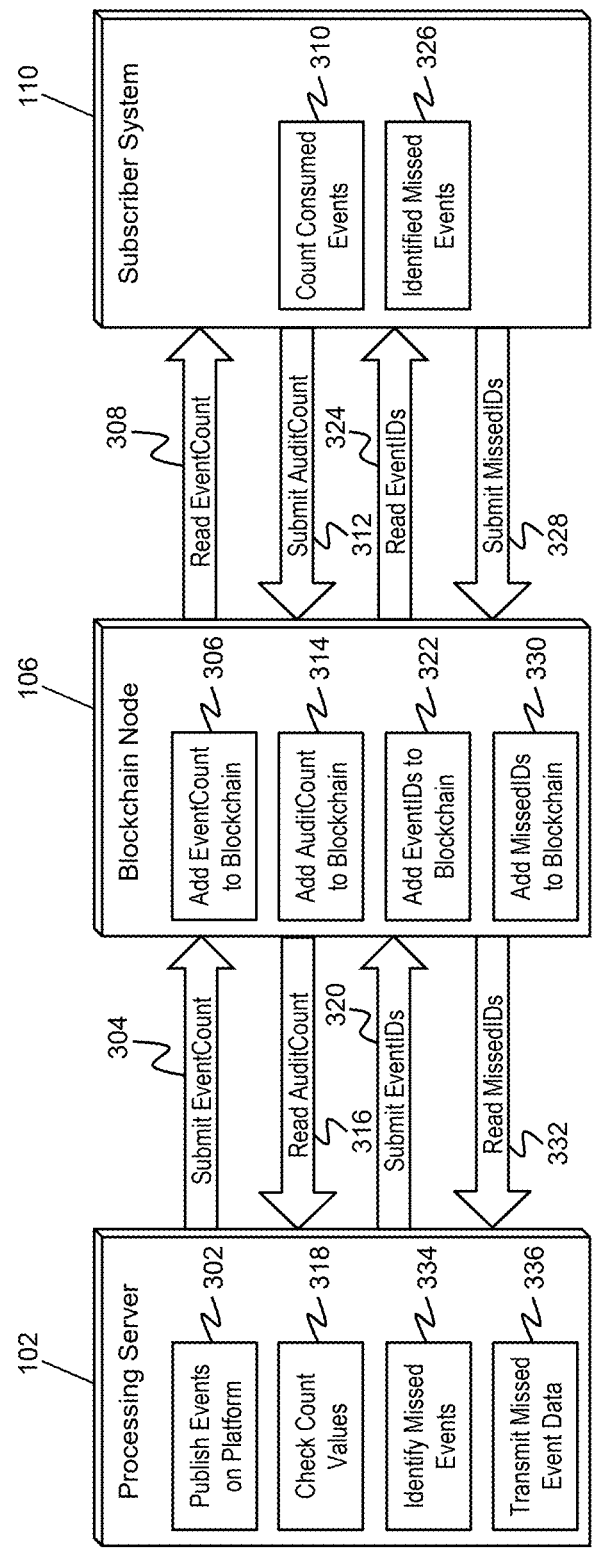
FIG. 3 is a flow diagram illustrating a process for reconciliation of published events using blockchain in the system of FIG. 1 in accordance with exemplary embodiments.

FIG. 3 illustrates a process 300 in the system 100 of FIG. 1 for the reconciliation of event messages published during a specific time period using a blockchain.

In step 302, the processing server 102 can published event messages for a plurality of events on the event platform 108 during a predetermined period of time. The event messages can be published such that any subscriber system 110 can obtain and consume the event messages via the event platform 108 using suitable methods. As part of the publishing of event messages, the processing server 102 can maintain a count of the number of published event messages during the predetermined period of time. In step 304, the transmitting device 224 of the processing server 102 can electronically transmit the EventCount value to the a blockchain node 106 in the blockchain network 104 using a suitable communication network and method.

The blockchain node 106 can receive the EventCount value and, in step 306, add the EventCount value to a blockchain associated with the blockchain network 104 that includes the blockchain node 106, where the EventCount can be included in a blockchain data entry that also includes timestamp data for the predetermined period of time. In step 308, the subscriber system 110 can read the EventCount for the predetermined period of time from the blockchain. In step 310, the subscriber system 110 can identify the number of event messages consumed from the event messages published by the processing server 102 on the event platform 108 during the predetermined period of time. In step 312, the subscriber system 110 can submit the AuditCount value to a blockchain node 106 in the blockchain network 104. The blockchain node 106 can receive the AuditCount value and, in step 314, add the AuditCount value to the blockchain, where the AuditCount can be included in a blockchain data entry that also includes timestamp data for the predetermined period of time.

In step 316, the processing server 102 can read the AuditCount for the predetermined period of time from the blockchain. In step 318, the validation module 220 of the processing server 102 can compare the EventCount and AuditCount values and determine that the AuditCount value is below the EventCount value, indicating that the subscriber system 110 missed one or more of the event messages published during the predetermined period of time. In step 320, the transmitting device 224 of the processing server 102 can transmit a list of EventIDs for all of the event messages published during the predetermined period of time to the blockchain node 106. In step 322, the blockchain node 106 can receive the EventIDs and add the EventIDs to the blockchain, where the EventIDs can be included in a blockchain data entry that also includes timestamp data for the predetermined period of time. In step 324, the subscriber system 110 can read the list of EventIDs from the blockchain. In step 326, the subscriber system 110 can use the list of EventIDs and stored data regarding consumed event messages to identify one or more EventIDs corresponding to event messages missed by the subscriber system 110 during the predetermined period of time and generate a list of the EventIDs for the missed event message(s), referred to herein as MissedIDs. In step 328, the subscriber system 110 can submit the MissedIDs to the blockchain node 106 using a suitable communication network and method.

In step 330, the blockchain node 106 can receive the MissedIDs and add the MissedIDs to the blockchain, where the MissedIDs can be included in a blockchain data entry that also includes timestamp data for the predetermined period of time. In step 332, the processing server 102 can read the MissedIDs from the blockchain. In step 334, the querying module 216 of the processing server 102 can execute one or more queries on the event database 206 of the processing server 102 to identify event messages for the missed events 208 using the MissedIDs read from the blockchain. In step 336, the transmitting device 224 of the processing server 102 can electronically transmit the identified event messages for the missed events for delivery to the subscriber system 110 via a message broker. The result of the process 300 is that the subscriber system 110 can always ensure that all event messages are consumed and where all participants in the system 100 can ensure consumption of all event messages and auditing of the publishing and consumption of event messages for accuracy.

Exemplary Method for Reconciliation of Published Events

FIG. 4 illustrates a method 400 for reconciliation of published events via use of a blockchain to ensure all published event messages during a period of time are consumed by a subscriber in a pub-sub architecture.

In step 402, a plurality of events (e.g., events 208) can be published on an event platform (e.g., event platform 108) by a processing server (e.g., processing server 102) during a period of time. In step 404, a numerical count of the plurality of events published on the event platform (e.g., EventCount) during the period of time can be transmitted by a transmitter (e.g., transmitting device 224) of the processing server to a blockchain node (e.g., blockchain node 106) of a blockchain network (e.g., blockchain network 104) for adding to a blockchain.

In step 406, a first block on the blockchain that includes a number of event consumed on the event platform (e.g., AuditCount) during the period of time can be received by a receiver (e.g., receiving device 202) of the processing server, wherein the number of events consumed is less than the numerical count of the plurality of events. In step 408, event data for each of one or more of the plurality of events published on the event platform during the period of time can be generated by a processor (e.g., querying module 216, generation module 218, etc.) of the processing server. In step 410, the generated event data can be transmitted by the transmitter of the processing server to the blockchain node of the blockchain network for adding to the blockchain.

In one embodiment, the method 400 can further include: receiving, by the receiver of the processing server, a second block on the blockchain that includes a list of a subset of events (e.g., MissedIDs) of the plurality of events; identifying, by the processor of the processing server, each event of the plurality of the subset of events on the list of events; and transmitting, by the transmitter of the processing server, the identified events. In a further embodiment, the event data for each of the one or more of the plurality of events can include an event identifier, and the list of the subset of events can include the event identifier for each event of the subset of events. In another further embodiment, the identified events can be transmitted to a third party system (e.g., subscriber system 110). In an even further embodiment, the identified events can be transmitted to the third party system via the event platform. In another even further embodiment, the second block can include identifying information for the third party system.

In some embodiments, the first block can further include an event identifier associated with each event consumed on the event platform during the period of time, and the one or more of the plurality of events can include events associated with an event identifier not included in the first block. In one embodiment, the method 400 can also include determining, by the processor of the processing server, that the number of events consumed on the event platforms is less than the numerical count of the plurality of events prior to generating the event data.

Computer System Architecture

FIG. 5 illustrates a computer system 500 in which embodiments of the present disclosure, or portions thereof, can be implemented as computer-readable code. For example, the processing server 102, blockchain nodes 106, event platform 108, and subscriber system 110 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for reconciliation of published events using blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for reconciliation of published events using blockchain, comprising:

publishing, by a processing server, a plurality of events on an event platform during a period of time;

transmitting, by a transmitter of the processing server, a numerical count of the plurality of events published on the event platform during the period of time to a blockchain node of a blockchain network for adding to a blockchain;

receiving, by a receiver of the processing server, a first block on the blockchain that includes a number of events consumed on the event platform during the period of time, wherein the number of events consumed is less than the numerical count of the plurality of events;

generating, by a processor of the processing server, event data for each of one or more of the plurality of events published on the event platform during the period of time; and transmitting, by the transmitter of the processing server, the generated event data to the blockchain node of the blockchain network for adding to the blockchain.

2. The method of claim 1, further comprising:

receiving, by the receiver of the processing server, a second block on the blockchain that includes a list of a subset of events of the plurality of events;

identifying, by the processor of the processing server, each event of the list of the subset of events; and transmitting, by the transmitter of the processing server, the identified events.

3. The method of claim 2, wherein the event data for each of the one or more of the plurality of events includes an event identifier, and the list of the subset of events includes the event identifier for each event of the subset of events.

4. The method of claim 2, wherein the identified events are transmitted to a third party system.

5. The method of claim 4, wherein the identified events are transmitted to the third party system via the event platform.

6. The method of claim 4, wherein the second block includes identifying information for the third party system.

7. The method of claim 1, wherein the first block further includes an event identifier associated with each event consumed on the event platform during the period of time, and the one or more of the plurality of events includes events associated with event identifiers not included in the first block.

8. The method of claim 1, further comprising:

determining, by the processor of the processing server, that the number of events consumed on the event platform is less than the numerical count of the plurality of events prior to generating the event data.

9. A system for reconciliation of published events using blockchain, comprising:

a blockchain network including a plurality of blockchain nodes;

an event platform; and a processing server, wherein the processing server publishes a plurality of events on the event platform during a period of time, transmits, via a transmitter, a numerical count of the plurality of events published on the event platform during the period of time to one blockchain node of the plurality of blockchain nodes for adding to a blockchain, receives, via a receiver, a first block on the blockchain that includes a number of events consumed on the event platform during the period of time, wherein the number of events consumed is less than the numerical count of the plurality of events, generates, via a processor, event data for each of one or more of the plurality of events published on the event platform during the period of time, and transmits, via the transmitter, the generated event data to the one blockchain node for adding to the blockchain.

10. The system of claim 9, wherein the receiver of the processing server receives a second block on the blockchain that includes a list of a subset of events of the plurality of events, the processor of the processing server identifies each event of the list of the subset of events, and the transmitter of the processing server transmits the identified events.

11. The system of claim 10, wherein
the event data for each of the one or more of the plurality
of events includes an event identifier, and
the list of the subset of events includes the event identifier
for each event of the subset of events.

12. The system of claim 10, further comprising a third party system, wherein the identified events are transmitted to the third party system.

13. The system of claim 12, wherein the identified events are transmitted to the third party system via the event platform.

14. The system of claim 12, wherein the second block includes identifying information for the third party system.

15. The system of claim 9, wherein
the first block further includes an event identifier associated with each event consumed on the event platform during the period of time, and
the one or more of the plurality of events includes events associated with event identifiers not included in the first block.

16. The system of claim 9, wherein the processor of the processing server determines that the number of events consumed on the event platform is less than the numerical count of the plurality of events prior to generating the event data.

* * * * *